2 Sheets--Sheet 1.

J. S. PRICE & P. MILLER.
Grain-Registers.

No. 134,928. Patented Jan. 14, 1873.

Witnesses:
R. P. Emmet.
Geo. H. Earnest.

Inventor:
Jacob S. Price.
Peter Miller.
By B. C. Converse
Their atty in fact.

AM. PHOTO-LITHOGRAPHIC CO. N.Y. (OSBORNE'S PROCESS.)

2 Sheets--Sheet 2.

J. S. PRICE & P. MILLER.
Grain-Registers.

No. 134,928. Patented Jan. 14, 1873.

Witnesses:
R. P. Emmet
Geo. H. Earnest

Inventor:
Jacob S. Price.
Peter Miller.
By B. C. Converse,
Their atty in fact

AM. PHOTO-LITHOGRAPHIC CO. N.Y. (OSBORNE'S PROCESS)

UNITED STATES PATENT OFFICE.

JACOB S. PRICE, OF CHAMPAIGN COUNTY, AND PETER MILLER, OF CLARKE COUNTY, OHIO.

IMPROVEMENT IN GRAIN-REGISTERS.

Specification forming part of Letters Patent No. 134,928, dated January 14, 1873.

*To all whom it may concern:*

Be it known that we, JACOB S. PRICE, of the county of Champaign, and PETER MILLER, of the county of Clarke, in the State of Ohio, have jointly invented certain Improvements in Machines for Measuring and Tallying Grain and Seeds, of which the following is a specification:

Our invention relates to the combination of incline cut-offs or shields, with the slides of a grain-measuring and tallying machine, in such manner that the cut-off shall cover a part of the slides within the hopper and measure, their object being to prevent the grain and small seeds—as timothy, clover, and mustard—from entering the front crevice or slot formed for the slides, and to permit them to be easily and quickly drawn out, thereby giving much more accuracy to the measurement. Our machine is of nearly a square form, the sides from which the slides are drawn out being vertical, and are attached to machines for thrashing grain and grass seeds. It is particularly applicable to clover-hulling machines, which require great accuracy in the machine for measuring and tallying the seed. Our machine has two horizontal metal slides rigidly connected together so as to be operated by one movement, the upper one allowing the seed to pass through its opening from the hopper into the grain-receptacle, and the lower one discharging it. It is provided with a hopper for receiving the seed from the conveyer, and has also a ratchet-wheel and indicator for marking the number of bushels which pass through it, the count being registered when the slides are drawn out.

Figure 1:
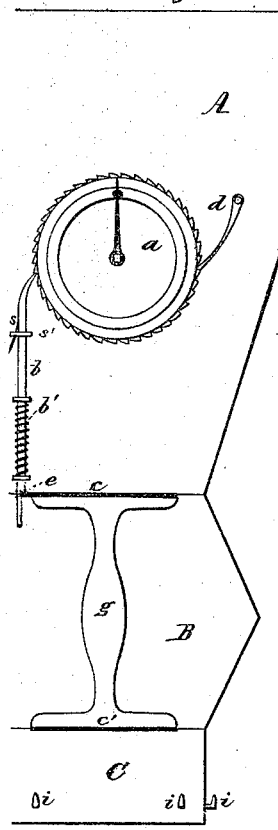
Figure 2:
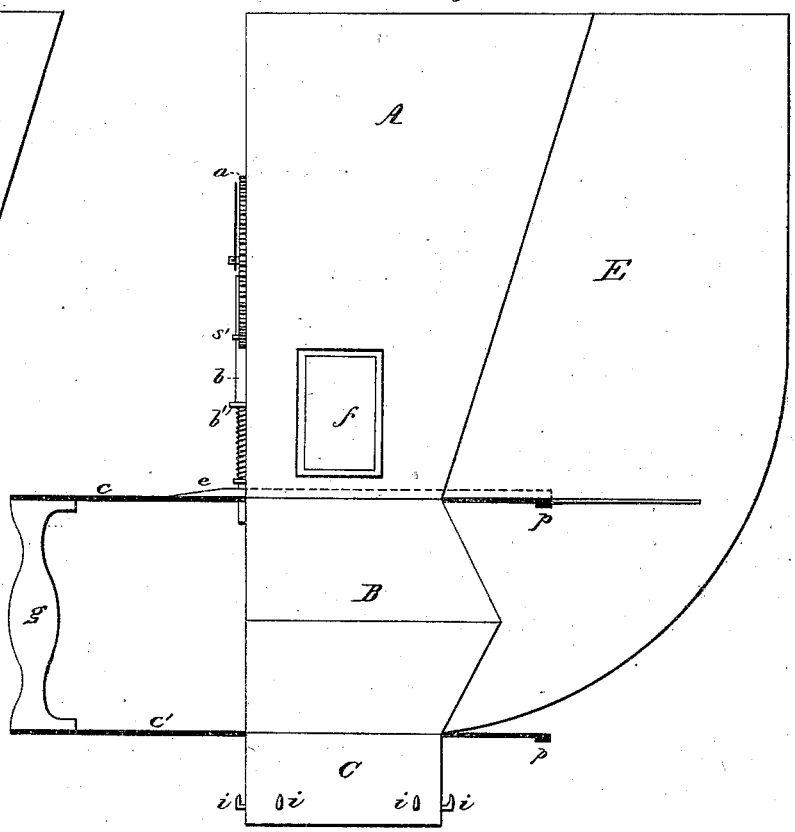
Figure 4:
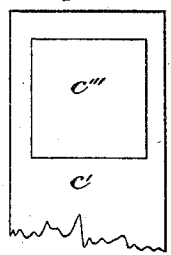
Figure 3:
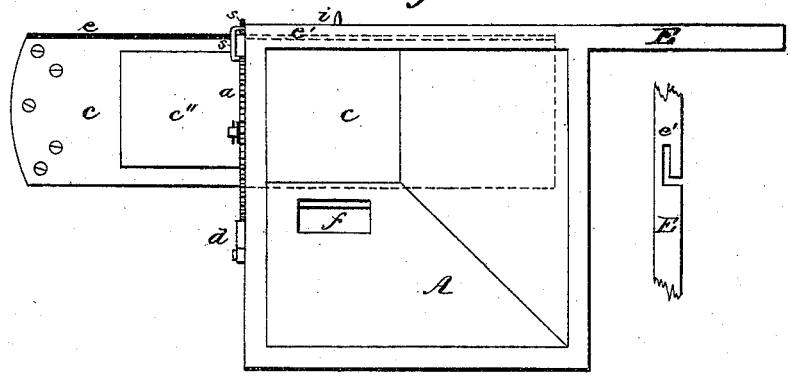
Figure 5:
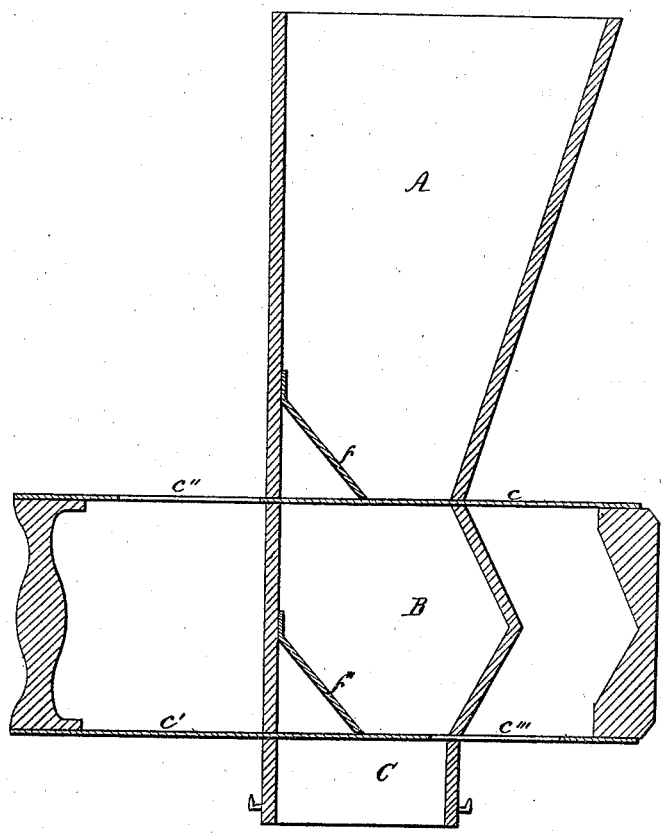

Figure 1 is a front elevation of a grain and seed measuring and tallying machine, with our improvement. Fig. 2 is a side elevation of the same. Fig. 3 is a plan view, the upper cut-off or shield being removed. Fig. 4 shows the rear end of the lower slide with the opening in the same. Fig. 5, Sheet 2, is a vertical section, and shows the position of the cut-offs or shields.

A is the hopper portion; B, the measure or grain-receptacle of our grain and seed measuring and tallying machine. C is the discharge-pipe; $c$ and $c'$ are the slides, which may be rigidly connected at one or both ends. In Fig. 1 they are connected at the front end only by the handle $g$, the stops $p$ at their rear ends preventing their being drawn entirely out. In Fig. 5 the slides are shown connected at both ends. We prefer this form of construction, as it gives greater strength and stiffness to the slides. $a$ is a ratchet-wheel; $b$, a lever which is raised by drawing out the slides, it being notched out to rest on the flange $e$ of the upper slide. This lever is provided with a spiral spring, $b'$, to hold it down on the flange. Its upper end works in the teeth of the ratchet-wheel, turning it one tooth at a time when raised in drawing out the slides, which have openings $c''$ and $c'''$ in them for the passage of the grain. A retaining spring-pawl, $d$, drops behind each tooth as it revolves, while a pointer marks the tally. Lever $b$ has also a flat spring, $s$, passing through loop $s'$ to hold the upper end against the face of the ratchet-wheel. $ff$ are cut-offs or shields. (See Fig. 5, Sheet 2.) These are made of sheet metal, and are fastened to the inner front part of both hopper A and grain-receptacle B, extending back over the slides $c$ and $c'$, at an angle, to near the middle of the throat, their lower edges being bent and made thin and sharp, and setting close down to the surface of the slides so as to prevent any grain, however small, from getting under them, thereby insuring the quick and entire discharge of the grain and seed; whereas, without these shields or cut-offs, small seeds would be drawn into the slots in the front of the machine from which the slides are drawn out, and clog them.

Seeds, when round—such as clover and mustard—revolve more or less on the surfaces of the slides when being drawn out; and, as we have found from repeated experiments that shields of wood would not prevent small seeds from being drawn into the front slots by the slides, we have constructed shields of sheet metal, bent in the form shown, with their edges made sharp to fit closely to the surfaces of the slides in order to effect the object of our invention.

We do not claim a box having inclined sides, with the discharge-opening either in the center or at one corner, as the same is common in smut-machines, in flouring-mills, and in some grain-elevators; but

What we claim as our improvement is—

The combination and arrangement of shields $f$, slides $c$ and $c'$, hopper A, and grain-receptacle B, as and for the purposes hereinbefore set forth.

JACOB S. PRICE.
PETER MILLER.

Witnesses:
A. P. LINN COCHRAN,
B. C. CONVERSE.